July 21, 1925. 1,546,487
J. C. GOOSMANN
PRESSURE RELATION REGULATING VALVE
Filed March 10, 1920 2 Sheets-Sheet 1
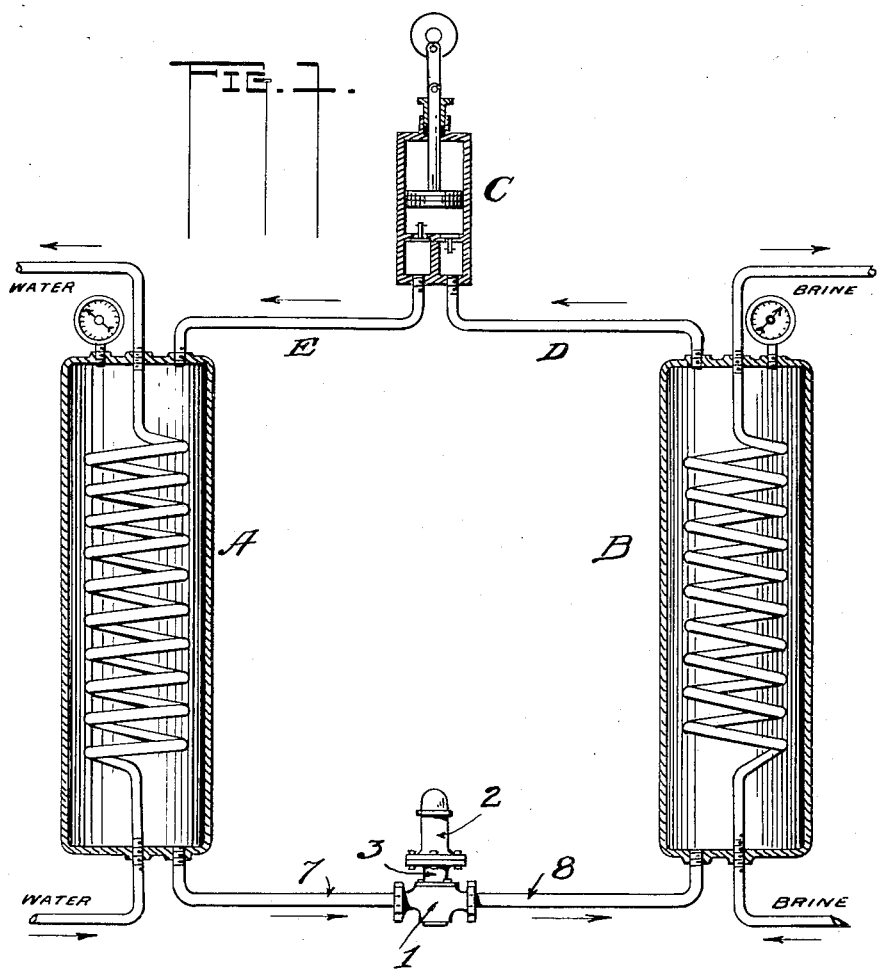
Inventor:
J. C. Goosmann,
By L. M. Thurlow
Atty.

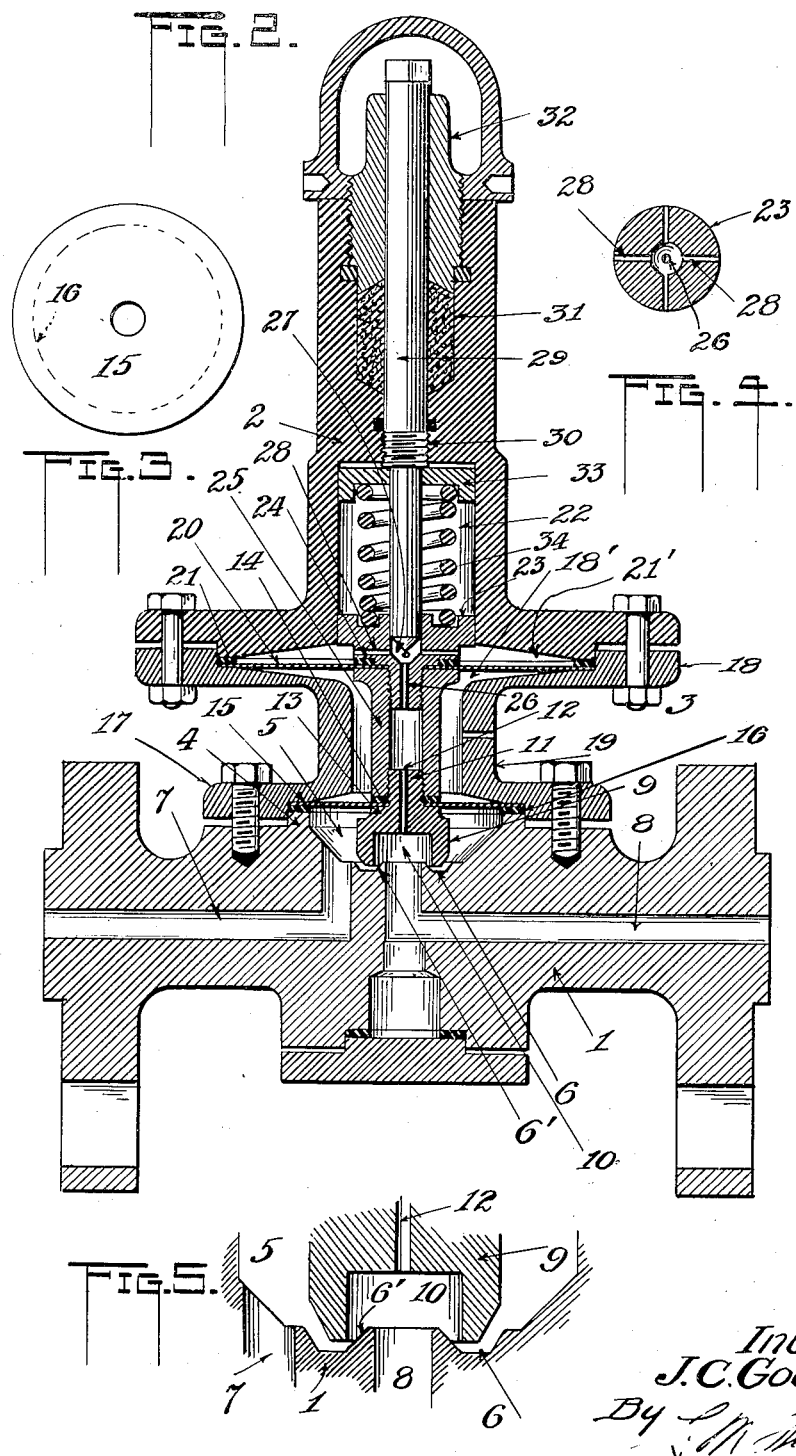

Patented July 21, 1925.

1,546,487

UNITED STATES PATENT OFFICE.

JUSTUS C. GOOSMANN, OF PEORIA, ILLINOIS.

PRESSURE-RELATION-REGULATING VALVE.

Application filed March 10, 1920. Serial No. 364,840.

*To all whom it may concern:*

Be it known that I, JUSTUS C. GOOSMANN, a citizen of the United States, residing at Peoria, in the county of Peoria and State of Illinois, have invented certain new and useful Improvements in Pressure-Relation-Regulating Valves; and I do hereby declare that the following is a full, clear, and exact description of the invention, which will enable others skilled in the art to which it appertains to make and use the same.

My invention pertains to improvements in valves for refrigerating systems. Said valve is of the pressure-reducing type commonly known as an expansion valve for use in refrigerating systems employing a medium operating under relatively high condenser and evaporator pressure and especially those in which carbon dioxide is used as the refrigerating agent, said valve, however, being also adapted for use in other places or for other purposes where a medium is to be reduced in pressure.

The science of mechanical refrigeration is based upon the proper maintenance and control of condenser and evaporator pressures and these again, on their part, depend upon and must be adjusted to correspond with the temperature of the water available for purposes of liquefaction in the condenser on one side, and with the temperature of evaporation in the cooler or evaporator on the other.

The adjustment of these pressures in practice is often difficult and leads to more or less trouble and undesirable results when, as often happens, the refrigerating system is operated by someone not possessing the requisite knowledge of pressure and temperature relation and who cannot, therefore, make proper adjustments. The invention, therefore, relates particularly to a valve that will automatically control pressures in a refrigerating system.

An object of the invention is to furnish in a refrigerating apparatus, using a refrigerating medium to be reduced in pressure, a pressure-reducing valve of an automatic type which, when properly adjusted for work, will maintain the pressure relation in said apparatus substantially fixed regardless of outside influences.

Another object of the invention is to provide a pressure-reducing or expansion valve in which pressures may be determined and adjusted to correspond with existing condenser and desired evaporator temperature in the refrigerating system, said valve thereafter maintaining such pressures automatically without further manual adjustment or hand manipulation.

Another object is to produce a pressure-reducing or expansion valve, to be termed a pressure relation valve, for use in handling a gas in refrigerating systems, for example, wherein the relation of two unequal pressures may be maintained substantially fixed.

Another object is that of providing a pressure relation valve that will automatically maintain the high pressure and low pressure of a medium being handled in substantially fixed relation.

Still another object is that of constructing a pressure relation valve including two diaphragms of unequal area, both having control of a movable valve or closure, the smaller of the two diaphragms adapted to be acted upon by high pressure tending to open the valve, the other adapted to be influenced by low pressure tending to close said valve, whereby to maintain a substantially fixed relation between the two pressures.

A still further object of my invention is to construct a pressure relation valve that will be automatic in action and wherein any desired ratio between the high and low pressures may be obtained and held.

Also, there is the further object of furnishing a pressure relation valve the closure of which will automatically constrict the valve-passage to hold back pressure at the high pressure side of the valve when the pressure at the low pressure side reaches too high a point.

Besides these several objects the invention relates to certain details of construction to be pointed out herein and which will form the subject of some of the claims.

In the appended drawing Figure 1 illustrates a refrigerating system including therein my pressure relation or expansion valve.

Figure 2 is a vertical section of the valve shown in Fig. 1 greatly enlarged.

Figure 3 is a plan of a diaphragm.

Figure 4 is a transverse section of one of the parts entering into the construction of the valve, and Figure 5 is a detail in vertical section of a valve and valve-seat structure.

My pressure relation valve is adapted for use in any system where pressures are to be reduced, or stepped down, being especially valuable in refrigerating systems where the liquefied medium supplied by and delivered from the condenser unit must be reduced in or paritally released from pressure in order to induce its change from a liquid to a gaseous state.

The ratio of pressure reduction varies with the particular gas used for refrigerating purposes. The normal reduction of pressure in the ammonia refrigerating system represents a ratio of 10 to 1. In other words, a normal pressure of liquefaction in the condenser of 150 pounds gauge pressure must be reduced to a normal evaporating pressure of 15 pounds gauge.

In the carbonic system of refrigeration this ratio between condenser and evaporator pressure is normally 3 to 1; that is, a pressure of liquefaction of 970.2 lbs. gauge and a pressure of evaporation of 323.4 lbs. gauge.

The diaphragms are so proportioned that at these normal pressure differences the valve is balanced. As soon as the normal ratio is disturbed or changed the valve becomes unbalanced, and the unbalanced pressure relation will strive either to reduce or increase the valve aperture.

Since the two pressures are controlled by the average temperature in the condenser on the high pressure side and the temperature of evaporation on the low pressure side, it is necessary to provide means whereby the pressure ratio can be changed or readjusted without changing the diameter of the two diaphragms.

It will be clear, also, that the same principle of pressure-ratio or relation may be employed in substantially the same manner and by the same means for any purpose requiring the constant control of a predetermined ratio between a high pressure on one side and a low pressure on the other, when the the medium so controlled in its passage through the valve passes under high pressure on one side to a lower pressure on the other.

This control of pressure-relation is particularly useful when liquid bodies are converted into vapors or gases by means of a release of pressure; or for gaseous matter reduced in pressure while maintaining a constant pressure ratio and also for liquids passing from constant high pressure to constant low pressure.

And while the valve is automatic in action it is arranged to be manually closed to the entrance of pressure if at any time the system of which it is a part is to undergo repairs, adjustments or changes.

Fig. 1 of the drawing indicates the conventional diagram of a refrigerating system of the compression type. A indicating a condenser, B an evaporator, and C a compressor connected by a pipe D with the condenser and by means of a pipe E with the evaporator, my automatic pressure relation valve being shown in the pipe system.

Said valve includes in its construction a main body-portion 1, a bonnet 2, and an intermediate portion 3, all being suitably secured in fixed relation. One of the sides of the portion 1 is formed whereby to provide a projecting annular flange 4. Inward from the flange the said portion is recessed as at 5, there being an annular channel or groove 6 at the bottom of the recess.

7 is a passage in the portion 1 terminating at one end in the bottom of said recess 5 outward from the described flange, its opposite end opening through one of the outer walls of the said portion, said passage constituting the inlet for high pressure.

8 is the low pressure duct connected with and leading from the recess or cavity 5 outside the said portion 1, both the described passages being for connection with any piping system, not shown. It is noted that the passage 8 enters the recess inward from the annular groove 6 described or substantially in the center of the area enclosed by said groove. Also, it is observed that the opening of said passage is above the bottom of said groove and that the wall 6' of the latter that surrounds the outlet of the passage is cone-shaped for a purpose to be made known later.

9 indicates the closure or seating portion of the valve. It has a recess 10 in its lower side and includes a threaded reduced portion or stem 11 having a passage 12 extending through it connecting at one end with the said recess 10. The reduction of the metal to provide the reduced stem 11 leaves an annular shoulder 13 upon which rests a gasket 14 and the central portion of a diaphragm 15, Figure 3, said diaphragm being perforated centrally to receive the said stem. This diaphragm at its marginal edge is supported by the flange 4 described, there being interposed between these portions, however, a packing ring or gasket 16. The intermediate portion 3 of the valve body previously referred to comprises two spaced flanges 17 and 18 connected by a tubular portion 19, the flange 17 resting upon the marginal edge of the diaphragm 15. The said flange and the tubular portion 19 are cut away above the diaphragm 15 to give that member clearance, it being understood that the recess or cavity 5 below the diaphragm gives a space for the same purpose. The upper surface of the flange 18 is recessed at 18' to receive into it a diaphragm 20 having a much greater area than the said diaphragm 15, and the upper end of the tubular portion 19 of the intermediate portion 3 receives the central portion of the diaphragm 20 upon it. The marginal edge of the latter receives a gasket 21 upon which rests the bonnet 2, the latter being recessed at 21' to give the diaphragm full clearance. Said bonnet has a recess 22 within which is movable a member 23. The said diaphragm 20 and a gasket 24 being clamped between a shoulder 24' of the member and the upper end of a tubular portion 25 which receives threaded engagement of and carries both the said member 23 and the stem 11 of the closure 9.

26 is a duct in a part of the member 23 connected into a bore 27 in said member, there being one or more ducts 28 connecting the said bore 27 with the space above the diaphragm 20.

29 is a valve stem for threaded engagement with the bonnet at 30, for example, its lower end being shouldered and reduced below the threads and extending into the said bore 27 of the member 23. Above the threaded portion 30 is a suitable packing 31 and a gland 32. A follower ring 33 lies within the recess 22 surrounding the stem 29, and a spring 34 is interposed between said ring and the member 23. It is noted that the diaphragms and the parts 9, 25 and 23 make up, for practical purposes, a unitary structure and that by the interposition of the several gaskets or packing rings there can be no leakage past said diaphragms of the medium being handled. The normal position, or position of rest, of the movable valve portion or closure 9 is shown in Fig. 1, being spaced slightly from the bottom of the groove 6.

The operation of a refrigerating system of the type described is well known and needs no description here. The liquefied medium coming from the condenser A enters the recess or cavity 5 of the valve from the high-pressure side through the passage or duct 7, and lifts the closure 9 by acting upon the under side of the small diaphragm 15, passing into the low-pressures duct 8.

The passages 12 and 26 and ducts 28 permit pressure in the passage 8 to enter the recess 21' above the diaphragm 20. When, however, the pressure in said passage 8 as well as in said recess 21' overbalance the pressure in the recess or cavity 5, due to the differential diaphragm area, the valve closure is moved toward its seat, reducing the passage beneath it and re-establishing the equilibrium of pressures.

The function of the spring 34 is that of providing further reduction of the pressure in passage 8 and recess 21' over that normally provided by the diaphragm areas. That is to say, the spring pressure is in addition to the pressure of the gas on the diaphragm 20, thereby changing the pressure relation to the extent that said spring reduces the pressure in the passage 8 to a greater degree than is afforded by the pressure of the gas alone on said diaphragm, depending, of course, upon the tension imparted thereto by the stem 29 through the ring 33.

I have already referred to the cone-shaped wall 6' which is one wall of the groove 6 that lies outward from the mouth of the passage 8 beneath the valve or closure 9. The purpose of the groove is that since more or less oil is carried along with the gas a small amount will lodge in said groove and form a tight seal for the valve or closure 9 when that member is seated. Due to the fact that the valve may seat in a groove of the form shown, the space exposed beneath it increases rapidly as said valve rises, and but a slight lift results in the creation of a comparatively large opening. The diameter of the recess or cavity 10 of the valve is sufficient to receive the coned wall 6' into it and permits said valve to rest directly upon the bottom of the groove 6. Furthermore the valve may be caused to center due to the walls of its cavity engaging the walls of the cone at its base. If for any reason the valve 9 is to be manually seated the stem 29 is turned down, the shoulder 30 thus engaging the ring 33, gradually compressing the spring 34 which in turn depresses the valve 9 and holds it yieldingly upon its seat.

Finally, in the continued movement of the stem its lower end engages the member 23 at the bottom of the bore 27 positively holding the valve on its seat and incidentally closing the passage 26. Diaphragms of different diameters may be employed by which to vary the relation of the pressures one to the other when used for other purposes than that herein, as may be understood, the ratio three to one herein being but one example.

My valve is distinguished from the prior art in having the diaphragms disposed in separate compartments of the cavity in the valve-body, or isolated from one another, to the end that only the pressure intended to influence a given diaphragm can reach it. By this arrangement, the pressure can be more readily and easily governed, and controlled in a more positive manner than in a device where the diaphragms or their equivalents are stationed in a recess common to both of them upon both of which one of the pressures may act.

Where there is a definite ratio between the two diaphragm areas and neither can be influenced by a pressure other than that intended for it, the results must of necessity be positive since there are no outside influences brought to bear upon either.

Hand operated pressure reduction, or expansion valves in which the valve opening is rigid or inflexible have the disadvantage of accumulating impurities, such as small particles of grit, dirt, metallic chips and the like at its restricted orifice, or beneath the closure, clogging the passage, thereby reducing the evaporating pressure and disarranging correct pressure relations. This difficulty is avoided in my automatic pressure relation valve since the passage through the valve is made "flexible" due to the controlled valve 9 and is automatically increased whenever impurities tend to obstruct it, causing a reduction of the evaporator pressure and an increased liquid pressure which will blow the passage clear and re-establish the original pressure condition or relation. This, as will be seen, is another distinct advantage in my type of valve.

Minor changes may be made in the detailed construction of my valve without sacrificing the spirit of the invention or departing from the scope of the appended claims.

I claim:

1. In a valve of the character described, the combination of a body provided with high pressure and low pressure chambers, a high pressure fluid supply duct in continuous communication with said high pressure chamber, a low pressure discharge duct opening into said high pressure chamber, a diaphragm in each chamber, a valve connected with the diaphragms and adapted to shut off communication between said supply and discharge ducts through said high pressure chamber, and a passage through the valve through which continuous communication is established between said low pressure chamber and said discharge duct.

2. In a pressure-relation regulating-valve for the reduction of pressure of a gas, a body including a duct for conveying the gas, a valve seat in said duct, a closure adapted in conjunction with said seat to control the opening of the duct and the flow of the gas therethrough, and means carrying and governing the movement of the closure comprising two portions having differential areas, the portion having the smallest area being continuously exposed and subjected to the action of the high pressure gas in said duct to give opening movement to said closure, the portion having the larger area being in position to be uninfluenced by high pressure in the duct, there being a separate passage through said means for leading low pressure from the duct to and upon the portion having said larger area.

3. A valve for the purposes described including a body having two ducts and a cavity into which one end of each said duct opens at one side, a diaphragm closing the cavity at its other side influenced by high pressure from one of the ducts, a valve in control of the other of the ducts influenced by said diaphragm, there being a recess in the body, and a diaphragm therein influenced by pressure from the duct controlled by the valve, the last named diaphragm also adapted to influence said valve and the first diaphragm, there being a passage leading from the last named duct through the valve to the said recess.

4. A valve for the purposes described including a body having two passages and a cavity into which one end of each said duct opens at one side, a diaphragm closing the cavity at its other side influenced by pressure from one of the passages, a valve in control of one of the passages influenced by the diaphragm, there being a recess in the body, a diaphragm therein influenced by pressure from the passage controlled by the valve, the last named diaphragm also adapted to influence said valve and the first diaphragm, there being a passage leading from the last named passage through the valve to the said recess, and manually controlled means for seating the valve.

5. A valve for the purposes described including a body having two passages therein and a cavity at one side of the body into which one end of each passage opens, a diaphragm closing the cavity, a recessed member receiving the diaphragm and seated upon the marginal edge of the same, a second diaphragm seated on said member, a valve carried by the diaphragms arranged to have control of one of the passages, a recessed bonnet seated upon the marginal edge of said second diaphragm, and a passage leading from the last named passage to the recess in the bonnet.

6. A valve for the purposes described including a body having two passages therein and a cavity at one side of the body into which one end of each passage opens, a diaphragm closing the cavity, a recessed member receiving the diaphragm and seated upon the marginal edge of the same, a second diaphragm seated on said member, a valve carried by the diaphragm arranged to have control of one of the passages, a recessed bonnet seated upon the marginal edge of said second diaphragm, and a passage leading through the valve to the recess in the bonnet.

7. A valve for the purposes described including a body having two passages therein and a cavity at one of the sides of the body within which one end of each passage terminates, a structure mounted upon the body overlying said cavity and itself having a cavity, a pair of spaced diaphragms of unequal area, the smallest closing the first described cavity influenced by pressure in one of the passages, the other being enclosed at one side in the cavity of said mounted structure and influenced by pressure from the other passage, a valve structure carried by the diaphragms adapted for controlling one of the ducts, there being a passage leading from the passage last named to the cavity having the diaphragm of the largest area.

8. A valve of the type named comprising a body having an interior cavity including a valve-seat, there being a passage leading from the outside the body to the cavity, there being a second passage leading from the cavity outside the body, a structure surmounting the latter having a recess opposite the cavity, a diaphragm interposed between the cavity and recess, and exposed to the first named passage, a bonnet surmounting the structure having a cavity opposite the said recess, a larger diaphragm interposed between the cavity and recess, a closure for the valve-seat to cover the mouth of said second passage, and means uniting the diaphragms and closure, there being a third passage extending through the said means for conveying pressure from the said second named passage to the cavity in the bonnet upon the said larger diaphragm.

9. A valve of the type named comprising a body having an interior cavity including a valve-seat, there being a passage leading from outside the body to the cavity, there being a second passage leading from the cavity outside the body, a structure surmounting the latter having a recess opposite the cavity, a diaphragm interposed between the cavity and recess and exposed to the first named passage, a bonnet surmounting the structure having a cavity opposite the said recess, a larger diaphragm interposed between the cavity and recess, a closure for the valve-seat to cover the mouth of said second passage, means uniting the diaphragms and closure, there being a third passage extending through the said means for conveying pressure from the said second named passage to the cavity in the bonnet upon the said larger diaphragm, and a spring adapted to move the diaphragms and the closure toward the valve-seat.

10. A valve of the type named comprising a body having an interior cavity including a valve-seat, there being a passage leading from outside the body to the cavity, there being a second passage leading from the cavity outside the body, a structure surmounting the latter having a recess opposite the cavity, a diaphragm interposed between the cavity and recess and exposed to the first named passage, a bonnet surmounting the structure having a cavity opposite the said recess, a larger diaphragm interposed between the cavity and recess, a closure for the valve-seat to cover the mouth of said second passage, means uniting the diaphragms and closure, there being a third passage extending through the said means for conveying pressure from the said second named passage to the cavity in the bonnet upon the said larger diaphragm, a spring adapted to move the diaphragms and closure toward the valve-seat, and means to govern the tension of the spring.

11. A valve of the type named comprising a body having an interior cavity including a valve-seat, there being a passage leading from outside the body to the cavity, there being a second passage leading from the cavity outside the body, a structure surmounting the latter having a recess opposite the cavity, a diaphragm interposed between the cavity and recess and exposed to the first named passage, a bonnet surmounting the structure having a cavity opposite the said recess, a larger diaphragm interposed between the cavity and recess, a closure for the valve-seat to cover the mouth of said second passage, means uniting the diaphragms and closure, there being a third passage extending through the said means for conveying pressure from the said second named passage to the cavity in the bonnet upon the said larger diaphragm, and a member to close the said third passage.

12. A valve of the type named comprising a body, having an interior cavity including a valve-seat, there being a passage leading from outside the body to the cavity, there being a second passage leading from the cavity outside the body, a structure surmounting the latter having a recess opposite the cavity, a diaphragm interposed between the cavity and recess and exposed to the first named passage, a bonnet surmounting the structure having a cavity opposite the said recess, a larger diaphragm interposed between the cavity and recess, a closure for the valve-seat to cover the mouth of said second passage, means uniting the diaphragms and closure, there being a third passage extending through the said means for conveying pressure from the said second named passage to the cavity in the bonnet upon the said larger diaphragm, and a member to positively hold the closure on the valve-seat.

13. A valve of the type named comprising a body having an interior cavity including a valve-seat, there being a passage leading from outside the body to the cavity, there being a second passage leading from the cavity outside the body, a structure surmounting the latter having a recess opposite the cavity, a diaphragm interposed between the cavity and recess and exposed to the first named passage, a bonnet surmounting the structure having a cavity opposite the said recess, a larger diaphragm interposed between the cavity and recess, a closure for the valve-seat to cover the mouth of said second passage, means uniting the diaphragms and closure, there being a third passage extending through the said means for conveying pressure from the said second named passage to the cavity in the bonnet upon the said larger diaphragm, and a member to close the said third passage and move the closure and hold it positively upon the valve-seat.

14. In a pressure-relation regulating-valve, the body thereof including an interior cavity, a passage leading into the cavity from outside the body, and a passage leading from said cavity outside the body, there being a depression in said cavity forming a valve-seat, the mouth of one of the passages terminating within the confines of the depression and above the bottom thereof, a perforated closure adapted to rest in the depression, and means to carry the closure comprising two portions in control of the closure, one having a smaller area than the other and disposed in the first named passage affected by the pressure therein to move the closure in one direction, the other portion being disposed whereby the pressure in the other passage will operate through the perforation in said closure upon it to move the closure in the opposite direction.

15. In a valve of the character described, the combination of a body provided with high and low pressure chambers and having inlet and outlet ducts opening into the high pressure chamber, differential diaphragms in the chambers respectively, a hollow valve carried by said diaphragms and establishing communication between the low pressure chamber and the outlet duct, said valve being adapted to shut off communication between the high pressure chamber and the outlet duct, a spring normally urging said valve toward its seat in opposition to the effort of the high pressure diaphragm, and means for regulating the tension on said spring.

16. In a valve in combination, a body provided with high pressure and low pressure chambers, a high pressure fluid supply duct in open communication with said high pressure chamber, a low pressure duct adapted to communicate with said high pressure chamber, a diaphragm forming a partition in each chamber, a valve operatively associated with both diaphragms and normally closing said low pressure discharge duct and means automatically operative to open and close said valve in accordance with differential pressure between said high pressure and low pressure ducts.

In testimony whereof I affix my signature in presence of two witnesses.

JUSTUS C. GOOSMANN.

Witnesses:
E. R. BREEDLOVE,
HARRY J. NEUMILLER.